Oct. 26, 1965
R. L. SMIRL ETAL
3,213,991
COVER ASSEMBLY FOR CLUTCH
Filed June 7, 1962
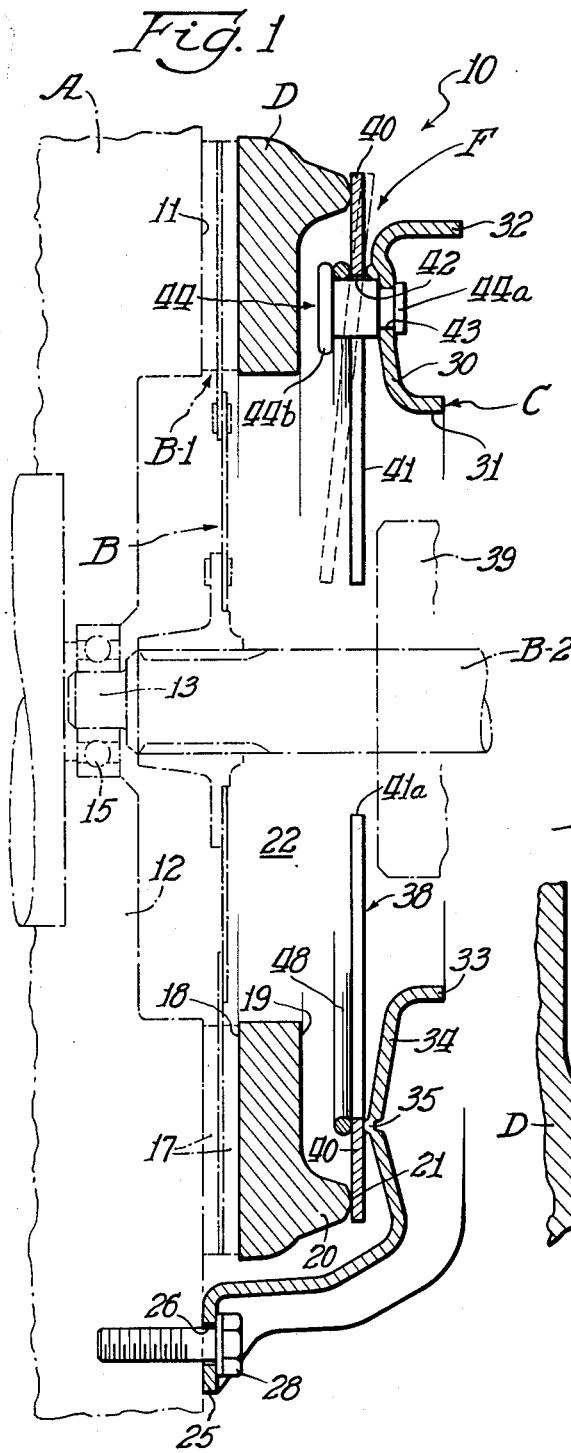
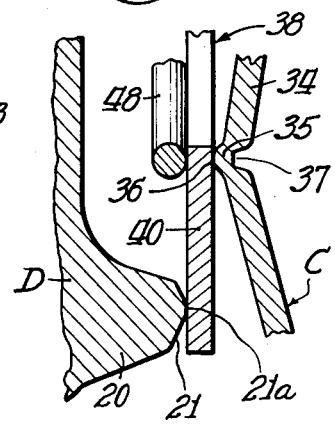
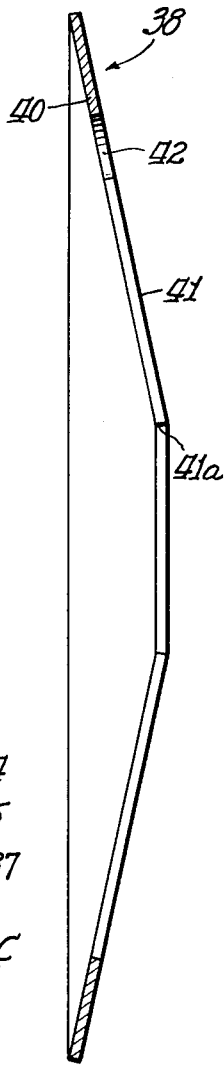
Inventors:
Richard L. Smirl
and Leo W. Cook
By: Joseph W. Malleck Atty.

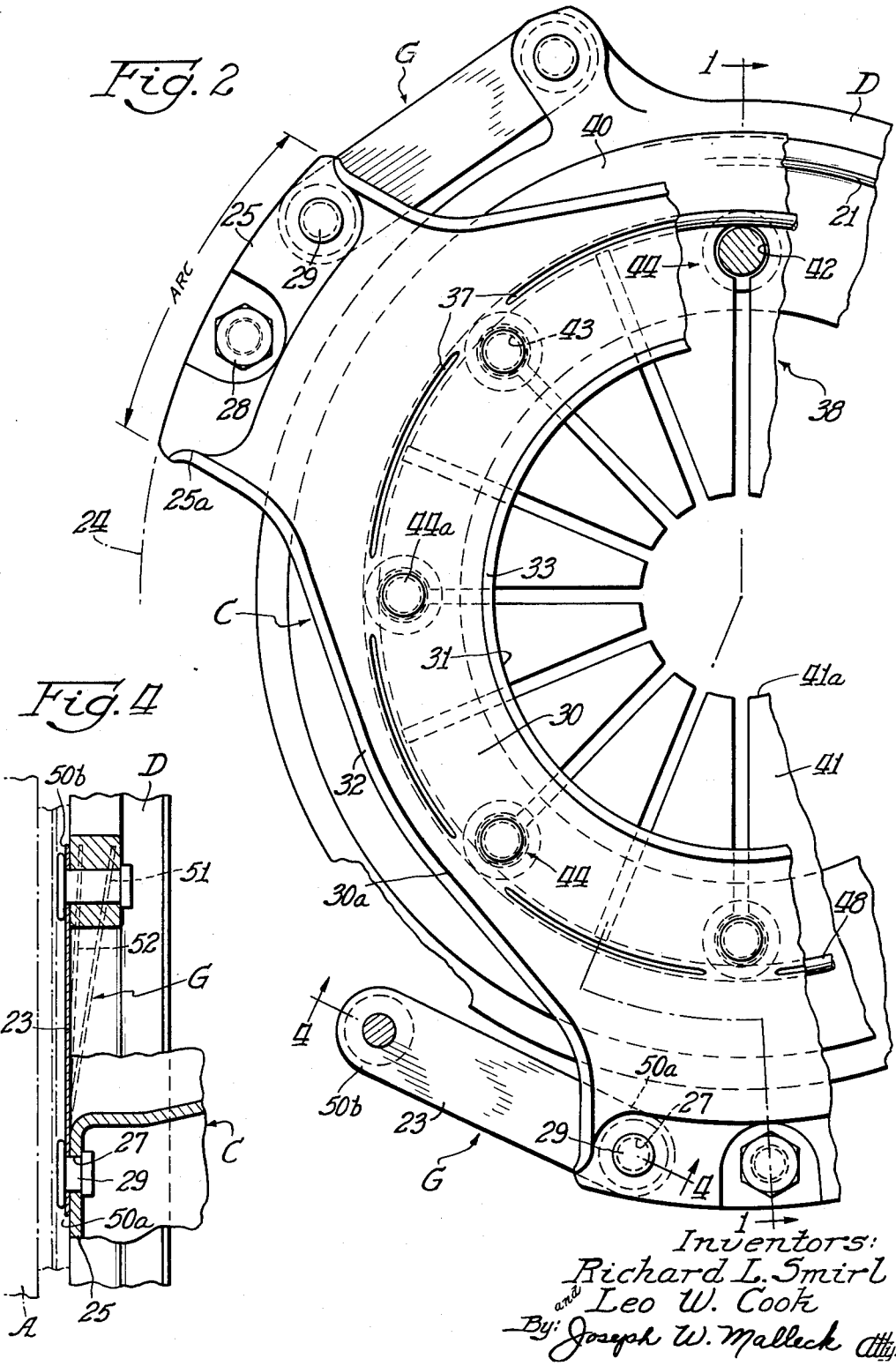

United States Patent Office 3,213,991
Patented Oct. 26, 1965

3,213,991
COVER ASSEMBLY FOR CLUTCH
Richard L. Smirl, La Grange Park, and Leo W. Cook, Chicago, Ill., assignors to Borg-Warner Corporation, Chicago, Ill., a corporation of Illinois
Filed June 7, 1962, Ser. No. 200,844
2 Claims. (Cl. 192—112)

This invention relates to clutch improvements and more particularly to improvements in the operation of a spring-fingered diaphragm clutch of the manually-operable type.

A spring-fingered diaphragm clutch usually employs a driving member in the form of a flywheel driven by the engine, another driving member which may take the form of axially shiftable pressure plate, and a driven member in the form of a disc adapted to be packed between the flywheel and the pressure plate. A cover plate is secured to the flywheel and more or less encloses the driven disc and pressure plate. Pressure plate actuating means, particularly comprising a spring-fingered diaphragm, is employed to act between the cover plate and the pressure plate for effecting clutch engagement and disengagement.

It is highly desirable in clutches of this type to provide as economical a construction and method of fabrication as possible, while at the same time retaining adequate operating characteristics and durability. Furthermore, it is highly desirable, especially in automobiles, that the clutches translate the flow of power from the driving or engine shaft to the driven or transmission shaft, upon closing of the clutch, with a smooth and gradual action as contrasted with an uncontrolled and jerky action.

One specific improvement afforded by this invention is directed to a reaction means against which the diaphragm may react and substantially comprises the cover plate; the reaction means is particularly characterized in that the cover plate is indented at circumferentially spaced locations to directly engage the diaphragm and provide an economical and precise reaction engagement. The cover plate also carries separate supporting means adapted to hold an annular ring against a side of the diaphragm oppositely disposed from the side against which the cover plate is engaged. The ring and cover plate indentations cooperate to provide a rocking fulcrum for the diaphragm when moving between clutch engaging and disengaging positions. Employment of the cover plate as an integral part of a rocking fulcrum for the diaphragm eliminates parts which have heretofore been necessary in prior art constructions.

Another specific object is the provision of an improved cover plate construction, uniquely adapted to cooperate with the spring-fingered diaphragm. The cover plate is characterized by a polygonal shaped configuration having uniformly spaced frontal or mounting portions interconnected by chordally disposed portions forming the body or rear part of the cover plate. Each of the chordal portions has a wall flange along the outer margin of each chordal portion and connecting said frontal portions, the wall flanges extend rearwardly from the body of the cover plate and are disposed generally normal to the plane of rotation of the cover plate. The frontal portions or stations are adapted to be secured directly to the flywheel, giving great strength and rigidity to the cover plate at these points, while the rearwardly extending flanges give unprecedented strength and rigidity to the body of the cover plate at the chordal portions thereof where strengthening is most needed. Such cover plate construction not only permits more accurate force determinations, but greatly increases the ventilation of clutch parts therein.

Still another specific object of this invention is to provide an improved pressure plate construction adapted to cooperate with the spring-fingered diaphragm means, including a plurality of circumferentially spaced thrust lugs, each lug having a sharply defined contact area for engagement with the outer periphery of the spring-fingered diaphragm. Such construction affords more precise calibration of the engaging and disengaging forces of the clutch than has heretofore been possible with prior art constructions.

Yet still another specific object of this invention is the provision of rotative driving strap means interconnecting the cover plate and the pressure plate; the strap means is uniquely characterized by an offset construction which is inherently urges each of the straps to a non-flat condition whereby the normal unflexed condition would be flat. A particular feature of the above object is the greater ability and versatility in adjusting the retracting force of the straps by regulating the initial offset. Furthermore, the offset strap construction affords a more constant retraction force while clutch wears.

Another object of this invention is the construction of a diaphragm type disc clutch, wherein a spring-fingered diaphragm is used to impart clutch engaging force and is pre-stressed during manufacture into a conical shape, the conical shape then being distorted to a flat condition upon assembly within the clutch whereby the diaphragm moves from a normally flat clutch engaged condition to a clutch disengaging condition which is the inversion of the initial conical shape. Such pre-stressing and flattening during assembly obviates jerky actuation of the clutch.

The above and other objects, advantages and uses of my invention will become more apparent from a reading of the following specification and claims taken in connection with the appended drawings which form a part of this specification, and wherein:

FIGURE 1 is a central sectional elevational view of a clutch device embodying the principles of this invention, taken substantially along line 1—1 of FIGURE 2;

FIGURE 2 is an end elevational view of the clutch device of FIGURE 1 with portions thereof broken away;

FIGURE 3 is an enlarged fragmentary sectional view of a portion of the device of FIGURE 1;

FIGURE 4 is an enlarged sectional view taken substantially along line 4—4 of FIGURE 2;

FIGURE 5 is a central sectional view of the spring-fingered diaphragm member when the member is in the unflexed condition.

Turning now more particularly to the drawings and specifically to FIGURES 1 and 2, there is illustrated a preferred embodiment of this invention. The clutch device, generally designated 10, comprises in its broad aspects a flywheel A drivingly connected to an engine driven shaft or other input means (not shown). A cover plate C is drivingly connected to the flywheel and together define an interior space 22 within which is disposed a driven means B. The clutch device comprises another driving member D, here being an axially movable pressure plate, adapted to clamp or pack a driven disc assembly B–1 (forming part of the driven means B) between it and the flywheel. Clutch operating means F is interposed between the cover plate and pressure plate to provide clutch engagement and disengagement. A novel strap drive means G (see FIGURES 2 and 4) is employed to drivingly interconnect the cover plate with the pressure plate.

Turning now in more particularity to the construction of the flywheel A, there is shown a flywheel of the flat-face type having an annular flat surface 11 adapted to engage the driven disc assembly B–1; a central portion 12 thereof is adapted to journal one end 13 of a driven shaft B–2, forming part of the driven means B, by way of bearing 15.

The driven means B comprises the annular driven disc assembly B–1 splined to the output shaft B–2 and carries annularly arranged friction material 17. The pressure plate D is of annular configuration, having one face 18 adapted to engage a side of the driven disc assembly opposite from the flywheel for providing clutch engagement. The outwardly facing side 19 of the pressure plate has formed thereon a plurality of circumferentially spaced thrust lugs 20 located adjacent the outer periphery of the pressure plate; each of the lugs are of a slightly tapered cylindrical shape and have a sharply defined end portion 21; the end portion 21 is adapted to terminate in a sharp apex 21a for the purpose of concentrating the interengagement between the outer periphery of the diaphragm actuating means F and the pressure plate.

Turning now more specifically to the cover plate C, heretofore such cover plates have been made by stamping the same from sheet metal. The cover plate was usually of circular form, thus conforming in shape to the other clutch parts, such as the flywheel, pressure plate and driven disc. The forming of such a cover plate, in giving the same prerequisite depth, results in drawing and thinning of the metal in certain portions thereof. It will be appreciated that slippage of the clutch generates considerable heat, and heretofore apertures have been formed in the clutch cover plate to allow for ventilation.

The present invention involves an improved cover plate structure which accomplishes at once a number of results. A large saving of material results from the making of a clutch cover plate constructed in accordance with the invention; a stronger cover plate is provided, the better to withstand the diaphragm spring pressure, thus minimizing flexure of the plate and providing a better releasing operation, as will later appear. The structure affords not only a saving in the area of the sheet metal stock used, but due to the structure, stock of a thinner gage may be employed, while at the same time increased strength is present in the cover plate. The structure of the cover plate admirably affords ventilation for the dissipation of the generated heat, and this without wasting metal stock as by punching holes therein, and without weakening the plate. Furthermore, the cover plate is adapted to integrally form part of the retaining or reaction means for the spring diaphragm, which heretofore has been accomplished fully by independent means carried by the cover plate.

The clutch cover plate C of the present invention has a generally polygonal configuration with frontal portions or fastening stations 25 formed at the corners of the polygon. The frontal portions each extend throughout a short arc of a circle 24 inscribing the corners of the polygon (shown in broken outline in FIGURE 2) and are of a width sufficient to support fastening means 28, such as cap screws, therethrough. The frontal portions are adapted to be securely attached to the outer periphery of the flywheel A for imparting drive to the cover plate and thereby to the pressure plate of the clutch mechanism. The frontal portions 25 all lie within a common plane parallel to the plane of rotation of the cover plate and are adapted to fit flush against the surface 11 of the flywheel. Each frontal portion has formed therein openings 26 and 27; opening 26 is adapted to receive the fastening means or cap screws 28 threadably attached to the flywheel and opening 27 is adapted to receive fastening means 29 (see FIGURE 4) securing drive links 23 thereto, which will be further described hereinafter.

The preferred embodiment herein depicts a clutch cover plate having a generally triangular shape with three portions 30 connecting the frontal portions 25 and each disposed chordally of the circle inscribing the polygonal shape. These portions 30 are disposed rearwardly of the frontal portions and together define the main body or portion of the cover plate. The inner periphery of the chordally disposed portions 30 define an annular opening 31 which permits access to clutch actuating parts therein and provides for ventilation of the clutch device during operation. The chordally disposed portions 30 are spaced sufficiently rearwardly of the frontal portions to define a space 22 therein to accommodate the pressure plate and driven disc in a clutch device.

Integral with the outer edges 30a of the chordal portions 30 and the side edges 25a of the frontal portions 25, are sidewall flanges or means 32 extending generally in a straight path between the frontal portions. The sidewall flanges 32 extend rearwardly from the general plane of the chordal portions and are disposed generally perpendicular to the plane of rotation of the clutch cover plate. Also, integral annular flange 33 is provided at the inner periphery of the chordal portions and extends rearwardly thereof, as shown in FIGURE 1. The flanges 32 and 33 cooperate in providing enhanced support and rigidity to the cover plate at areas remote from the secured frontal portions and thereby substantially obviating deflection of the cover plate during operation.

The cover plate may be formed of a blank of sheet metal generally of a triangular shape. The invention, however, is not limited to a plate having three chordal portions and three places of attachment to the flywheel, since the structure may be varied without depatring from the invention to provide a plate with a fewer number of chordal portions or a greater number of chordal portions. The cover plate may be considered to be of a semiflexible nature because of the reinforcing flanges which contain the generally flexible nature of sheet metal.

The chordal portions 30 forming the body of the cover plate are provided with conical sections (best shown in the lowermost portion of FIG. 1) which converge together toward annularly arranged arcuate indentations or deformations 34 therein. The arcuate extent of each of the deformations is uniformly spaced from the other and is disposed generally intermediate the width of the chordal portions 30. Such deformations, impart the V-shaped cross-sectional contour to the chordal portions, as best shown in FIGURE 1. The apex of the V-shaped cross section is formed as an offset bead 35, having at one side thereof a vertex portion 36 and at the opposite side a groove 37. The vertex portions 36 are adapted to directly contact the spring-fingered diaphragm 38.

Turning now more particularly to the spring-fingered diaphragm 38, it comprises an annular member or first portion 40 having circumferentially spaced spring-fingered elements or intermediate portions 41 extending radially inwardly therefrom and each element is adapted to have its innermost extent 41a or second portions lie adjacent the driven shaft B–2 for actuation by suitable disengaging means, such as collar member 39. The annular member 40 of the spring-fingered diaphragm has provided therein a plurality of circumferentially spaced openings 42 in alignment with similarly circumferentially spaced openings 43 provided in the chordal portions of the cover plate C. A plurality of fasteners 44 are provided, each fastener extending through the aligned openings 42 and 43 and having one end 44a secured to the cover plate and an opposite end provided with a radially extending annular flange 44b. The outer cylindrical surface of each fastener 44 is adapted to be spaced from the walls defining the opening 42, thereby permitting free movement of the diaphragm relative to the fasteners.

A ring or annular member 48 is disposed against the plurality of fasteners 44 and held in position between the diaphragm annular member 40 and the outer flange 44b of the fasteners. The ring 48 and the arcuate vertex portions 36 engage opposite sides of the diaphragm and together cooperate in forming a fulcrum means about which the radial extent of the diaphragm may rock or pivot during operation.

The spring-fingered diaphragm 38 is of the Belleville spring type and is formed of heat treated steel and is given an initial frusto-conical configuration as that shown in FIGURE 5. Such initial configuration is distorted or flattened to the shape as shown in full line in FIGURE 1 when assembled between the cover plate C and pressure plate D. Such assembled position holds the pressure plate in the clutch engaged position. The flattened condition may be considered a second phase or position of the diaphragm. A third phase or stage of the diaphragm is an inverted conical shape as shown in broken outline in FIGURE 1 and is assumed when the clutch is placed in the disengaged condition by movement of the disengaging collar 39 to the left and thereby inverting the diaphragm opposite to its original conical shape. Due to the heat treatment of the diaphragm during manufacture, the diaphragm will tend to revert back to its original shape upon release of the force of the disengaging collar 39.

Turning now in more particularity to the strap means G, it is seen to comprise a plurality of flexible links 23 each extending in a chordal direction relative to the circle 24 inscribing the cover plate, and each is adapted to have one end 50a fastened to a frontal portion 25 of the cover plate and an opposite end 50b fastened to a portion of the pressure plate, as shown in FIGURE 4. The opposite ends of the flexible links are fastened by means of fasteners 29, here being rivets.

Of particular importance is the preformed shape of the drive links and the shape assumed during operation. The links are initially given a decidedly offset configuration 51 (shown in broken outline in FIGURE 4), whereby the opposite ends 50a and 50b are spaced from each other in an axial direction of the clutch. During assembly of the clutch device, the flexible links are distorted part way from the fully offset position 51 and moved to an intermediate position 52 (also shown in broken outline in FIGURE 4), while still holding the pressure plate in a retracted or disengaged condition of the clutch. When the pressure plate is fully engaged, the offset links are moved into a flat condition, as shown in full outline in FIGURE 4. The spring characteristics and superior space accommodations are apparent from such construction.

The initial preset (or offset) of each strap determines the retracting force thereof; conventional strap construction is determined by the thickness, length, and width of each strap, as well as the deflection during the engaged condition of the clutch. The conventional construction is not as versatile since the amount of retraction force is more limited. Furthermore, the offset construction enables the straps to maintain a more constant retraction force even though the deflection thereof may change durng wear of the clutch.

Describing the operation of the device in detail, several conditions of the device may exist. For example, in the disengaged clutch condition, the pressure plate D is slightly spaced from the driven disc B-1 as permitted by the spring-fingered diaphragm 38 which is moved into the inverted broken outline position as shown in FIGURE 1. Such inversion is brought about by manual actuation of the disengaging collar 39 which is moved to the left and engages the inner portions 41a of the elements 41 of the diaphragm. The pressure plate D is positively moved to the retracted or disengaged position by virtue of offset drive links 23 which resiliently tend to return to the intermediate position 52 shown in broken outline in FIGURE 4.

In the fully engaged condition of the clutch, the disengaging collar 39 is released thereby permitting the spring-fingered diaphragm to tend to return to its original condition and thereby moves into the flat condition, as shown in full outline in FIGURE 1. In such condition, the radial cross-sectional extent of the diaphragm operates as a lever applying force to the lugs 20 of the pressure plate while reacting against the cover plate vertex portions 36 to apply such force. In moving between the engaged and disengaged conditions, the spring-fingered diaphragm has the radial extent thereof adapted to rotate or rock about the fulcrum means comprised of the ring 48 and annularly arranged vertex portions 36.

While we have described the invention in connection with specific constructions and arrangements, it is to be understood that this is by way of illustration and not by way of limitation and the scope of the invention is defined solely by the appended claims which should be construed as broadly as the prior art will permit.

We claim:
1. In a clutch device having rotatable input and output members and a clutching means movable between a clutch engaging condition and a clutch disengaging condition, a cover assembly comprising: a sheet metal cover having a plurality of flat lips lying in a common plane and a cylindrical wall section for each of said lips extending rearwardly from the plane of said lips, said cover plate having a generally annular rear wall integrally connected with each of said cylindrical wall connections and being comprised of conical sections joined by a plurality of arcuate channels each having a sharply turned radius transverse to the arcuate extent of the channel; a flexible diaphragm having an outer portion effective to impart a resilient force and an inner portion effective to be actuated for reducing the resilient force thereof and an intermediate portion effective to be fulcrumed; and fulcrum means comprising circumferentially spaced fasteners carried by said cover plate, and a ring mounted on said fasteners and disposed against a side of said diaphragm oposite from the side engaged by the cover plate arcuate channels.

2. In a clutch device, a cover assembly as in claim 1, in which said cover plate rear wall has a rearwardly extending flange integrally connected with the outer periphery of said rear wall and extending generally chordally between said lips.

References Cited by the Examiner

UNITED STATES PATENTS

| | | | |
|---|---|---|---|
| 2,234,755 | 3/41 | Geyer | 192—68 |
| 2,277,221 | 3/42 | Gamble | 192—68 |
| 2,765,892 | 10/56 | Reed | 192—68 X |
| 2,770,341 | 11/56 | Wobrock. | |
| 2,835,366 | 5/58 | Haussermann | 192—68 |
| 2,885,047 | 5/59 | Kehrl | 192—68 |
| 3,130,828 | 4/64 | Maurice | 192—89 X |

DAVID J. WILLIAMOWSKY, *Primary Examiner.*
ROBERT C. RIORDON, *Examiner.*